Oct. 10, 1950 D. G. ROOS 2,525,373
MEANS FOR LUBRICATING BEARINGS
Filed Aug. 14, 1945 2 Sheets-Sheet 1
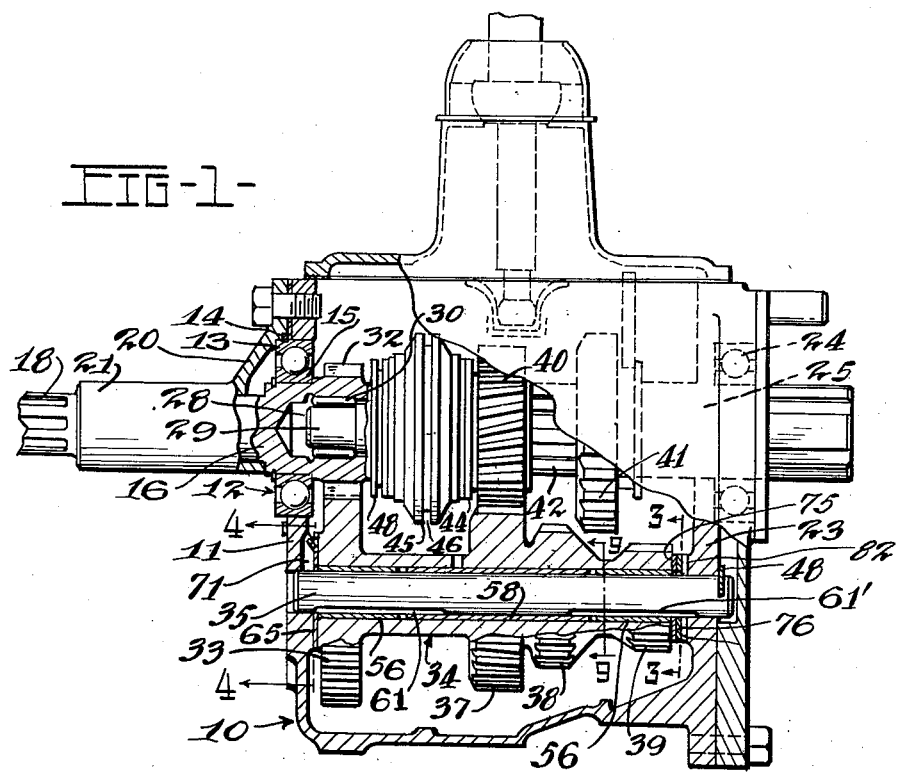
FIG-1-
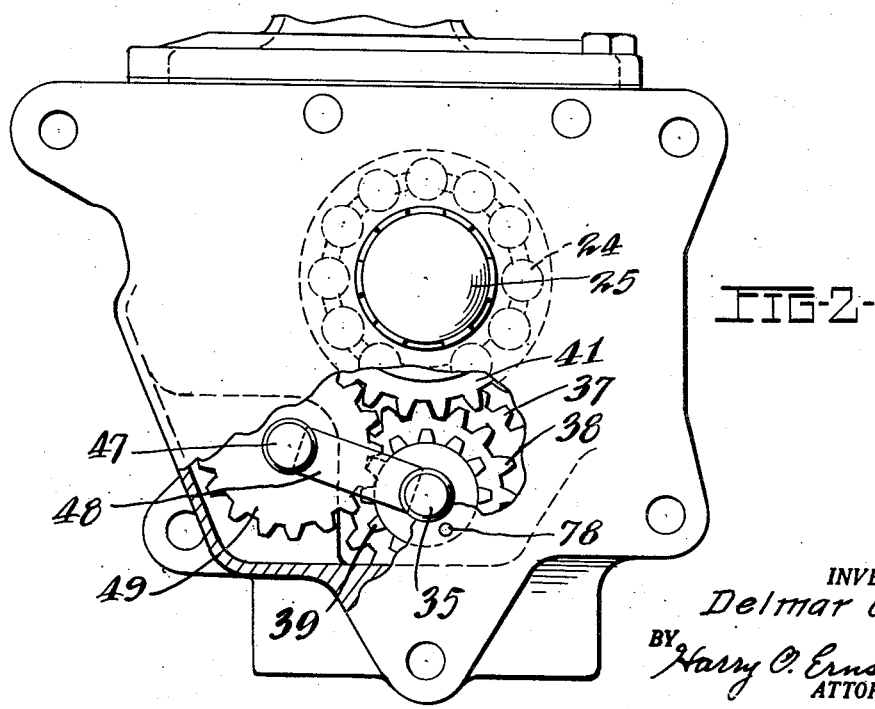
FIG-2-
INVENTOR.
Delmar G. Roos
BY Harry O. Ernsberger
ATTORNEY.

Oct. 10, 1950 D. G. ROOS 2,525,373
MEANS FOR LUBRICATING BEARINGS
Filed Aug. 14, 1945 2 Sheets-Sheet 2
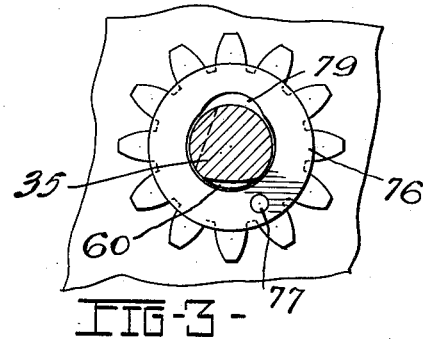
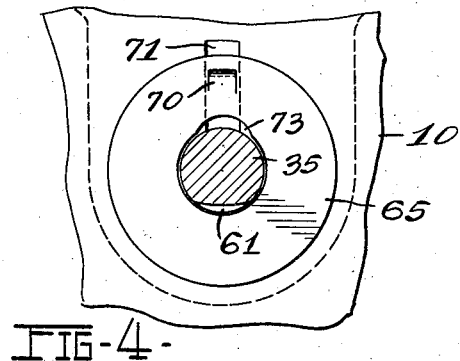
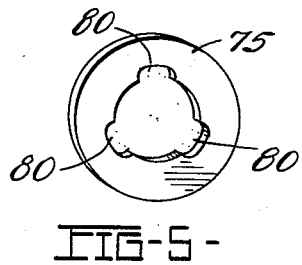
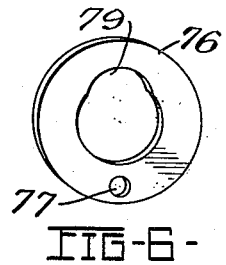
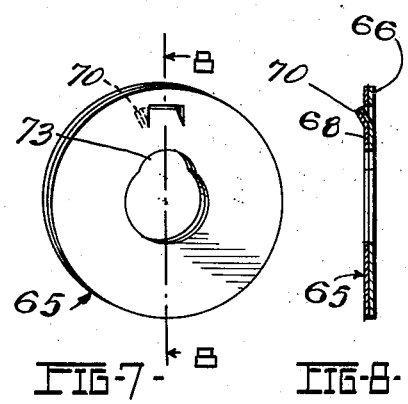
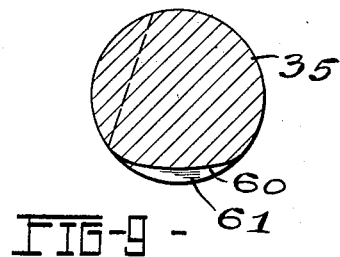
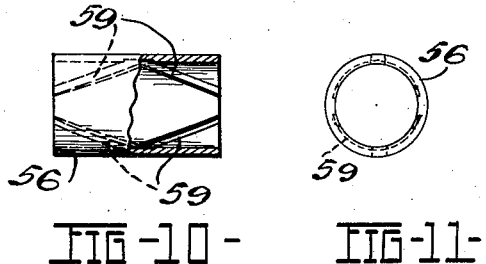
INVENTOR.
Delmar G. Roos
BY Harry O. Ernsberger
ATTORNEY.

Patented Oct. 10, 1950

2,525,373

UNITED STATES PATENT OFFICE 2,525,373

MEANS FOR LUBRICATING BEARINGS

Delmar G. Roos, Toledo, Ohio, assignor to Willys-Overland Motors, Inc., Toledo, Ohio, a corporation of Delaware Application August 14, 1945, Serial No. 610,756

3 Claims. (Cl. 184—11)

1

This invention relates to means for lubricating bearings and more especially to an arrangement for lubricating bearings associated with power transmission gearing.

In transmission gearing particularly of the type employed in automotive vehicles, the adequate lubrication of the counter shaft bearings supporting a gear cluster has presented a problem. The gear cluster of such transmission mechanism is usually of considerable length which factor aggravates the problem of lubricating the bearing means or bearing bushings through the medium of which the gear cluster is rotatably supported upon a relatively stationary shaft.

It is an object of the present invention to provide a means for adequately and satisfactorily lubricating the journal bearings supporting gear mechanism in a power transmission construction in which the end thrust bearing means are adequately lubricated in addition to insuring continuous lubrication for the gear supporting bearing bushings.

A further object of the invention resides in a novel arrangement of providing lubricant reservoirs in a shaft, upon which the countershaft gear bearings are mounted and in an arrangement of channels for conveying lubricant to said reservoirs without the employment of additional parts or elements.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred in which:

Figure 1 is an elevational view of power transmission gearing of a type typically employed in an automotive vehicle, certain parts being shown in section for purposes of illustration;

Figure 2 is an end elevational view of the arrangement shown in Figure 1, a portion of the housing being broken away for purposes of illustration;

Figure 3 is a transverse detail sectional view taken substantially on the line 3—3 of Figure 1;

Figure 4 is a transverse detail sectional view taken substantially on the line 4—4 of Figure 1;

Figure 5 is an isometric view of a thrust bearing forming a part of the construction;

Figure 6 is an isometric view of a thrust member or bearing forming a part of the construction;

2

Figure 7 is an isometric view of a thrust bearing arrangement for one end of the gear cluster or assembly;

Figure 8 is a vertical sectional view taken substantially on the line 8—8 of Figure 7;

Figure 9 is a transverse sectional view taken substantially on the line 9—9 of Figure 1, and Figure 10 is a vertical longitudinal sectional view through one of the bearing bushings forming a part of the gear assembly; and Figure 11 is an end view of the construction shown in Figure 10.

While I have shown an arrangement of my invention as embodied in an arrangement for lubricating bearings which support elements of a power transmission mechanism, it is to be understood that I contemplate the incorporation of my invention in any mechanism or element wherein the same may be utilized to enhance the lubrication of mechanical devices.

Referring to the drawings in detail, reference character 10 denotes a housing structure which is shaped or configurated to enclose power transmission gearing particularly adapted for transmitting power from an engine to the drive wheels of an automotive vehicle. Disposed within a recess is an opening in an end wall 11 of the housing 10 for an anti-friction bearing 12, the outer race 13 being secured in position by means of a snap ring 14, while the inner race 15 is mounted upon a shaft 16. The shaft 16 projects forwardly of the housing 10 and is formed with a splined portion 18 adapted for connection to an engine shaft or other source of power (not shown) the shaft extending through a bracket 20 the latter being secured to the transmission housing 10. The bracket 20 is integrally formed with a sleeve portion 21 which forms a substantial bearing or journal support for shaft 16 is addition to the anti-friction bearing 12.

The wall 23 of the transmission housing supports an antifriction or ball bearing 24 which supports a shaft 25 disposed in axial alignment with the shaft 16 and which is adapted to be connected to a propeller shaft (not shown) for transmitting power to the drive wheels of a vehicle or other mechanism to be driven. The portion of shaft 16 extending interiorly of the housing 10 is formed with a central aperture or chamber 28, and shaft 25 is formed at its forward end with a reduced tenon portion which extends into the chamber 28. A needle bearing assembly 30 is interposed between the tenon 29 and the wall of the chamber 28 thus providing antifriction bearing means supporting the forward end of shaft 25.

The shaft 16 is integrally formed with a toothed portion or gear 32 which is adapted for constant enmeshment with a gear 33 formed as an integral part of a countershaft cluster gear arrangement 34, the same being revolubly journaled upon a shaft 35 which is mounted in suitable openings formed in the housing end walls 11 and 23, the shaft 35 being non-rotatable in the embodiment illustrated. The countershaft cluster gear arrangement is also inclusive of integrally connected gears 37, 38 and 39. Gear 37 of the helical type is in constant mesh with a gear 40 which is journalled upon shaft 25 and arranged for independent rotation thereon. A gear 41 is mounted upon shaft 25 being slidable thereon and is suitably splined thereto upon a splined portion 42 formed on the shaft 25. The enmeshment of gear 38 with gear 41 provides a so-called "low speed" gear when gear 41 is moved to the left from its position indicated in Figure 1, whereby power is transmitted from shaft 16 to shaft 25 through the medium of gears 32, 33, 38 and 41 at a reduced ratio.

The helical gear 40 is provided with a toothed or dental clutch portion 44 which cooperates with a synchronizing device (not shown in detail) of conventional design so that when a slidable clutch member 45 is moved toward the right as viewed in Figure 1 by means of a yoke or shifting fork (not shown) which extends into a peripheral groove 46, a positive drive connection is established through the medium of clutch members 44 and 45 to complete a drive connection through gears 37 and 40 to the driven shaft 25. The gears 37 and 40 are conventionally known as a "second speed" gear.

The innermost end of shaft 16 is formed with a dental clutch portion 48 and is arranged for cooperation with the shiftable clutch member 45, which when moved to the left as viewed in Figure 1, establishes a direct drive connection axially from shaft 16 to shaft 25. This connection provides the "high speed" or direct driving connection without any change in speed ratio between said shafts.

Reverse gear is obtained in a conventional manner by slidably moving gear 41 to the right as viewed in Figure 1 to bring the same into enmeshment with an idler or reverse gear 49 which is in constant mesh with gear 39, the reverse gear being mounted upon an auxiliary stub shaft 47. The shafts 35 and 47 are formed adjacent their rear end portions with kerfs or slots which are adapted to receive a key or locking bar 48 as shown in Figures 1 and 2 for maintaining said shafts in non-rotatable relation in the housing 10.

Through the medium of the present invention, a simple yet effective arrangement is provided for lubricating the bearings supporting the cluster gear assembly 34 upon the shaft 35. In the present arrangement there is disposed within the cluster gear assembly 34 a pair of spaced bearing sleeves 56 which are held in spaced relation by means of a sleeve 58. The bearing members 56 are formed with a plurality of diagonally arranged lubricant grooves or kerfs 59 as shown in detail in Figure 10. The shaft 35 is formed with spaced surfaces 60 of flattened curvature as shown in Figure 9 which provide a pair of chambers or reservoirs 61 and 61' between the surfaces 60 of shaft 35 and the interior walls of bearings 56 adapted to contain lubricant. Means are provided at the extremities of the cluster gear assembly 34 for conveying oil or other lubricant to the reservoirs 61. Surrounding the shaft 35 at its forward end and disposed between the transmission end wall 11 and gear 33 is a thrust bearing 65 shown in detail in Figures 7 and 8. The bearing assembly 65 is preferably of laminated construction wherein a lamination 66, which is adapted for direct engagement with the end of gear 33 to provide a thrust bearing therefor, is formed of suitable bearing material which is backed up or reinforced by a similarly shaped lamination 68 of steel or other similar material for purposes of strength. In order to maintain the thrust bearing assembly 65 in non-rotatable position, the construction is provided with a struck-up projection or lip 70 which is adapted to extend into a channel 71 formed in the end wall 11 of the transmission housing. The bearing assembly 65 is formed with a recess or chamber 73 providing a path for conveying lubricant from the channel 71 to the surface of the shaft 35 and the reservoir 61 at the forward portion of the shaft.

Surrounding the shaft 35 and disposed between the rear end of the cluster gear assembly 34 and the inner wall 23 of the transmission housing are disks 75 and 76 which are illustrated in detail in Figures 5 and 6. The disk 76 is provided with an opening 77 which fits over a dowel or pin 78 mounted in the end wall 23 of the housing 10 so as to prevent relative rotation of the disk 76. The disk 76 is provided with a lubricant receiving recess 79. The disk 75, in conjunction with disk 76, provides a suitable thrust bearing arrangement for the rear end of cluster gear assembly 34, disk 75 being free to rotate about the axis of shaft 35. The interior portion of disk 75 is preferably formed with spaced recesses 80 which, during rotation of disk 75, are adapted for successive registration with recesses 79 in the disk 76. The inner wall 23 of the housing adjacent shaft 35 is formed with a lubricant conveying channel 82 which is adapted to convey lubricant from a lubricant supply contained in the transmission housing to the space or recess 79 formed in disk 76, thence through recesses 80 formed in disk 75 to the reservoir 61' arranged in the rear portion of the shaft 35, thus providing a series of communicating passageways which are adapted to convey lubricant to the reservoir 61' for lubricating the exterior surface of shaft 35 and the interior surfaces of the bearings 56. The lubricant from the spaces or reservoirs 61 and 61' is dispersed over the bearing surfaces by means of the grooves 59 in the bearing bushings 56.

It should be noted that the reservoirs or spaces 61 and 61' formed in the shaft 35 are preferably disposed in the lower portion of the shaft or out of direct line of applied load which is transmitted in a downward direction through the inter-enmeshing gears. This is desirable in order that an uninterrupted surface of shaft 35 is in a position to receive the direct radial load thrust and provides an extensive uninterrupted cylindrical surface for such purpose.

It is apparent that, within the scope of the invention, modifications and different arrangements may be made other than is herein disclosed, and the present disclosure is illustrative merely, the invention comprehending all variations thereof.

What I claim is:

1. In combination, a housing adapted to contain transmission gearing; a shaft extending into said housing; a helical gear associated with said shaft; a countershaft mounted in said housing; a cluster gear journaled for rotation upon said countershaft; said cluster gear including a helical gear arranged for constant enmeshment with said first mentioned helical gear; a pair of longitudinally spaced bearing bushings interposed between said cluster gear and said countershaft; said countershaft being formed with spaced peripheral flattened portions forming lubricant reservoirs; said reservoirs being disposed out of the path of the driving thrust imparted to the cluster gear; said bearing bushings being respectively arranged adjacent the lubricant reservoirs in said countershaft; thrust bearing members surrounding said countershaft and respectively disposed between each end wall of the housing and the cluster gear; said thrust bearings having lubricant receiving recesses formed therein, the openings in said thrust bearings to accommodate the countershaft being of larger diameters than the diameter of said shaft providing channels to accommodate the flow of lubricant to the lubricant reservoirs on the countershaft; and means including channels formed in the walls of said housing adjacent said thrust bearings for conveying lubricant to the recesses in said thrust bearings and to said reservoirs.

2. In combination, a housing adapted to contain transmission gearing; a shaft extending into said housing; a helical gear associated with said shaft; a countershaft mounted in said housing; a cluster gear journaled for rotation upon said countershaft; said cluster gear including a helical gear arranged for constant enmeshment with said first mentioned helical gear; a pair of longitudinally spaced bearing bushings interposed between said cluster gear and said countershaft; said countershaft being formed on a lower side thereof with longitudinally spaced peripheral flattened portions forming lubricant reservoirs; said reservoirs being spaced from the ends of the countershaft; said bearing bushings being respectively arranged adjacent the lubricant reservoirs in said countershaft and having channels formed therein for distributing lubricant over the bearing surfaces; thrust bearing members surrounding said countershaft and respectively disposed between each end wall of the housing and cluster gear; said thrust bearings having lubricant receiving recesses formed therein, the openings in said thrust bearings to accommodate the countershaft being of larger diameters than the diameter of said shaft providing channels to accommodate the flow of lubricant to the lubricant reservoirs on the countershaft; and means including channels formed in the walls of said housing adjacent said thrust bearings for conveying lubricant to the recesses in said thrust bearings and said reservoirs.

3. In combination, a housing adapted to contain transmission gearing; a shaft extending into said housing; a helical gear associated with said shaft; a countershaft mounted in said housing; a cluster gear journaled for rotation upon said countershaft; said cluster gear including a helical gear arranged for constant enmeshment with said first mentioned helical gear; a pair of longitudinally spaced bearing bushings interposed between said cluster gear and said countershaft; said countershaft being formed with longitudinally spaced flattened portions forming lubricant reservoirs; said reservoirs being disposed out of the path of the driving thrust imparted to the cluster gear; said bearing bushings being respectively arranged adjacent the lubricant reservoirs in said countershaft; a relatively stationary thrust bearing surrounding said countershaft and disposed adjacent an end wall of the housing; a relatively movable thrust bearing interposed between one end of said cluster gear and said stationary thrust bearing; said thrust bearings being arranged to receive longitudinally directed thrust set up by reason of the enmeshment of the helical gears; a single thrust bearing arranged adjacent the opposite end of the cluster gear; said thrust bearings having lubricant receiving recesses formed therein, the openings in said thrust bearings to accommodate the countershaft being of larger diameters than the diameter of said shaft to accommodate the flow of lubricant in said recesses to the lubricant reservoirs on the countershaft; and means including channels formed in the walls of said housing adjacent said thrust bearings for conveying lubricant to the recesses in said thrust bearings and to said reservoirs.

DELMAR G. ROOS.

REFERENCES CITED

The following references are of record in the file of this patent:

UNITED STATES PATENTS

| Number | Name | Date |
|---|---|---|
| 1,533,641 | Fekete | Apr. 14, 1925 |
| 1,759,943 | Herrmann | May 27, 1930 |
| 1,900,096 | Bushong | Mar. 7, 1933 |
| 1,953,113 | Lapsley | Apr. 3, 1934 |
| 2,106,870 | Floss | Feb. 1, 1938 |